United States Patent
Belkind et al.

(10) Patent No.: US 11,985,976 B2
(45) Date of Patent: May 21, 2024

(54) MIXTURE OF MECTINS AND PYRETHROIDS AND USES THEREOF

(71) Applicant: Valent BioSciences LLC, Libertyville, IL (US)

(72) Inventors: Benjamin A. Belkind, Wilmette, IL (US); Jason Clark, Elkhorn, WI (US); Banugopan Kesavaraju, High Ridge, MO (US); Peter DeChant, Portland, OR (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 102 days.

(21) Appl. No.: 17/342,754

(22) Filed: Jun. 9, 2021

(65) Prior Publication Data

US 2021/0386065 A1 Dec. 16, 2021

Related U.S. Application Data

(60) Provisional application No. 63/037,285, filed on Jun. 10, 2020.

(51) Int. Cl.
*A01N 43/16* (2006.01)
*A01N 53/00* (2006.01)

(52) U.S. Cl.
CPC .............. *A01N 43/16* (2013.01); *A01N 53/00* (2013.01)

(58) Field of Classification Search
None
See application file for complete search history.

(56) References Cited

U.S. PATENT DOCUMENTS

| | | |
|---|---|---|
| 7,906,127 B2 | 3/2011 | Clough |
| 9,826,742 B2 | 11/2017 | Belkind et al. |
| 2005/0208088 A1* | 9/2005 | Hofer ............ A01N 51/00 424/405 |
| 2017/0049108 A1* | 2/2017 | Belkind ............ A01N 53/00 |
| 2017/0094972 A1 | 4/2017 | Hoppe et al. |

FOREIGN PATENT DOCUMENTS

| | | | |
|---|---|---|---|
| CN | 1287783 A * | 3/2001 | |
| CN | 1795722 A * | 7/2006 | |
| CN | 104255776 A | 1/2015 | |
| CN | 103300020 B | 6/2016 | |
| CN | 107865011 A | 4/2018 | |
| WO | WO-2006069580 A1 * | 7/2006 | ............ A01N 43/90 |
| WO | 2017061959 | 4/2017 | |

OTHER PUBLICATIONS

Hougard, J., M. et al. "Bifenthrin . . . " J. Med. Entomol., 2002, 39(3), 526-533. (Year: 2002).*
Lipford, D. "Is Pyrethrum a safe organic pesticide?" (https://todayshomeowner.com/pest-control/guides/is-pyrethrum-a-safe-organic-pesticide/). (Year: 2010).*
International Search Report and Written Opinion dated Oct. 29, 2021.

* cited by examiner

*Primary Examiner* — Erin E Hirt
(74) *Attorney, Agent, or Firm* — Wood, Phillips, Katz, Clark & Mortimer

(57) ABSTRACT

The present invention is directed to a pesticidal mixture comprising one or more mectins and one or more pyrethroids. The present invention is further directed to a method of controlling pests comprising applying a mixture of the present invention to an area in need of pest control.

18 Claims, No Drawings

MIXTURE OF MECTINS AND PYRETHROIDS AND USES THEREOF

FIELD OF THE INVENTION

The present invention is directed to a pesticidal mixture comprising one or more mectins and one or more pyrethroids. The present invention is further directed to a method of controlling pests comprising applying a mixture of the present invention to an area in need of pest control.

BACKGROUND OF THE INVENTION

Arthropods, such as mosquitoes, are often a nuisance to humans and other animals. Arthropods can also be vectors for diseases. Due to the nuisance and public health issues, humans strive to control arthropod populations near their own environments. One way of controlling arthropods is by using pyrethroids.

Pyrethroids are axonic excitotoxins which prevent the closure of the voltage-gated sodium channels in the axonal membranes of arthropods. The toxins work by paralyzing the organism.

While pyrethroids are effective arthropod adulticides, a major problem is that populations of arthropods are developing resistance to them. Pyrethroid resistance, caused either by specific detoxification enzymes or an altered target site mechanism (knockdown resistance ("KDR")-type mutations in the sodium channels), has been reported on most continents in the majority of medically important mosquito species. If resistance continues to develop and spread at the current rate, it may render such insecticides ineffective in their current form. Such a scenario would have potentially devastating consequences in public health terms because there are as yet no obvious alternatives to many of the pyrethroids.

Resistance is a complex phenomenon arising from exposure to the same or a similar insecticide class over a period of multiple insect generations. Resistance develops due to extinction of susceptible individuals within the population and survival with subsequent reproduction of individuals who are inherently "immune" to the effects of the insecticide. Resistance can be due to multiple factors that include selection of target site mutations, detoxification enzymes and decreased cuticular penetration. Resistance may arise in naïve populations that have been previously identified as insecticide susceptible or those that have been exposed to insecticides of another or similar class or mode of action. Cross resistance can occur and, in addition to physiological resistance, behavioral resistance mechanisms may also be present. The end result of resistance to current control measures is that available insecticides are often inadequate to provide the mortality rates necessary to achieve sufficient levels of arthropod control at environmentally acceptable application rates. Because pyrethroid resistant insects pose a significant human health risk, there is a need in the art for a safe and effective arthropod insecticide.

Mectins are naturally occurring 16-membered macrocyclic lactone derivatives that are generated as fermentation products of *Streptomyces avermitilis*. Mectins exist in 4 specific homologs containing a mixture of a major component and a minor component. Synthetic mectins include, but are not limited to, ivermectin, abamectin, selamectin, doramectin, emamectin, lepimectin and eprinomectin. Natural mectins and synthetic derivatives thereof are known to control helminths and insects.

One type of arthropod that is of major health concern is mosquitoes. The three major genera of mosquitoes which transmit diseases are *Anopheles*, *Culex* and *Aedes*. Therefore, there is a need to control mosquitoes to reduce disease transmission.

Different insecticides can attack at different stage of the insects' development. However, it is the mosquito in the adult stage that transmits viruses and parasites which cause disease. Control of larval stages is a first line of defense for suppression of mosquito populations, but without the capacity to control adult mosquitoes the ability to manage disease can be severely compromised in many settings.

U.S. Pat. No. 9,826,742 is directed to pesticidal mixtures of a pyrethroid and fatty acids at a 1:1:1 ratio of octanoic acid, nonanoic acid and decanoic acid. While this mixture is successful in controlling *A. aegypti* known to be resistant to pyrethroids alone, there is no guarantee that *A. aegypti* will not become resistant to such mixtures in the future.

Thus, there is a need in the art for further pesticidal mixtures that are effective on pyrethroid resistant and pyrethroid susceptible arthropods.

SUMMARY OF THE INVENTION

In one aspect, the present invention is directed to a pesticidal mixture comprising one or more mectins and one or more pyrethroids.

In a preferred aspect, the present invention is directed to a pesticidal mixture comprising one or more mectins selected from the group consisting of abamectin and ivermectin and one or more pyrethroids selected from the group consisting of fenpropathrin, permethrin and pyrethrum and optionally, C8, 9, 10 fatty acids.

In another aspect, the present invention is directed to a method of controlling a mosquito comprising applying an effective amount of a mixture of the present invention to the mosquito or an area in need of mosquito control.

In another aspect, the present invention is directed to a method of controlling a mosquito comprising applying sequentially or concurrently an effective amount of one or more mectins selected from abamectin and ivermectin and an effective amount of one or more pyrethroids selected from fenpropathrin, permethrin and pyrethrum to the mosquito or an area in need of mosquito control.

DETAILED DESCRIPTION OF THE INVENTION

Applicant discovered that a mixture of one or more mectins and one or more pyrethroids is highly effective at controlling pests, especially mosquitoes. Application of the mixtures of the present invention provide a high mortality rate to arthropods including strains that are known to be resistant to pyrethroids or mectins alone.

In one embodiment, the present invention is directed to a pesticidal mixture comprising one or more pyrethroids and one or more mectins.

In a preferred embodiment, the present invention is directed to a pesticidal mixture comprising one or more mectins selected from the group consisting of abamectin and ivermectin and one or more pyrethroids selected from the group consisting of fenpropathrin, permethrin and pyrethrum and optionally, C8, 9, 10 fatty acids.

As used herein the term "mectins" includes compounds of formula (I):

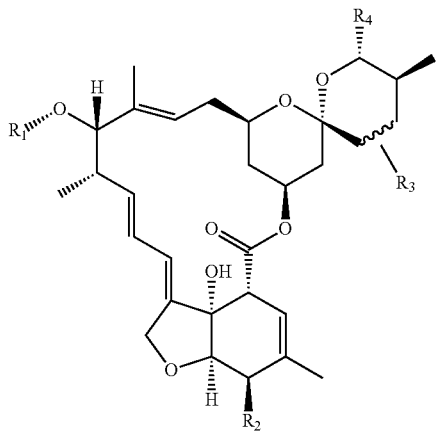

(I)

wherein:

R₁ is selected from the group consisting of

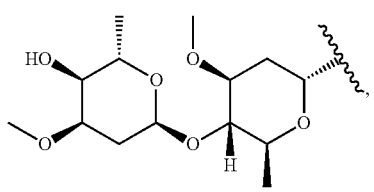

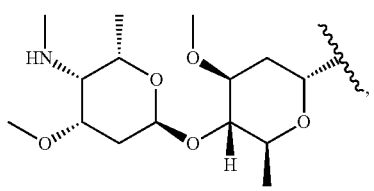

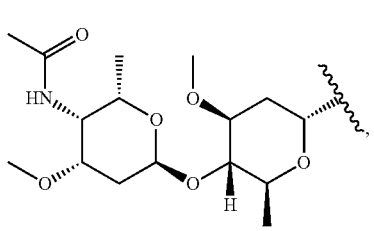

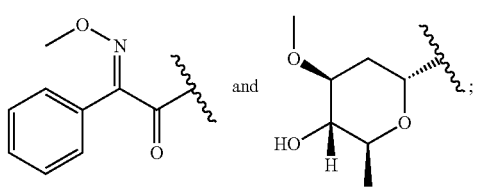 and $R_2$ is selected from the group consisting of a hydroxyl group and an imine, preferably an oxime, more preferably a ketoxime and most preferably

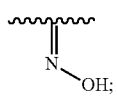

$R_3$ and $R_4$ are each independently selected from the group consisting of a C2-C6 alkyl, alkenyl, alkynyl, cycloalkyl, cycloalkenyl, cycloalkynyl and aryl, preferably

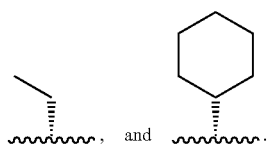

In a preferred embodiment, the one or more mectins are selected from the group consisting of those compounds of Table 1, below.

TABLE 1

TABLE 1-continued

| Compound | R₁ | R₂ | R₃ | R₄ |
|---|---|---|---|---|
| Eprinomectin B1b | [acetamido sugar structure] | OH | [cyclohexene linker] | [isopropyl] |
| Ivermectin B1a | [dihydroxy sugar structure] | OH | [cyclohexane linker] | [sec-butyl] |
| Ivermectin B1b | [dihydroxy sugar structure] | OH | [cyclohexane linker] | [isopropyl] |
| Lepimectin | [methoxyimino phenyl ketone structure] | OH | [cyclohexane linker] | [isopropyl] |
| Selamectin | [methoxy hydroxy sugar structure] | N–OH | [cyclohexane linker] | [cyclohexyl] |

In another preferred embodiment, the one or more mectins are selected from the group consisting of avermectin, abamectin including abamectin B1a and abamectin B1b, selamectin, dormamectin, ivermectin including ivermectin B1a and ivermectin B1b, emamectin including emamectin B1a and emamectin B1b, lepimectin and eprinomectin including eprinomectin B1a and eprinomectin B1b. In a more preferred embodiment, the one or more mectins are ivermectin or abamectin. In another embodiment, the mixtures of the present invention are free of abamectin.

As used herein the term "pyrethroid" includes compounds of formula (II), (III), (IV) and (V):

(II)
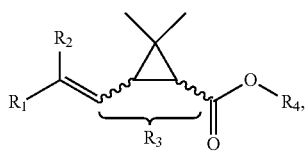
wherein:
R₁ is selected from the group consisting of $CH_3$, $CF_3$, Br, Cl and
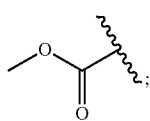;
R₂ is selected from the group consisting of H, $CH_3$, Br and Cl;
R₃ is selected from the group consisting of
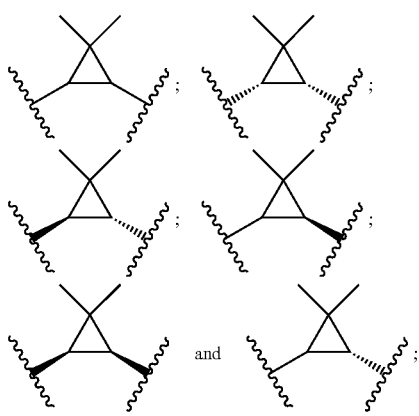
and
R₄ is selected from the group consisting of
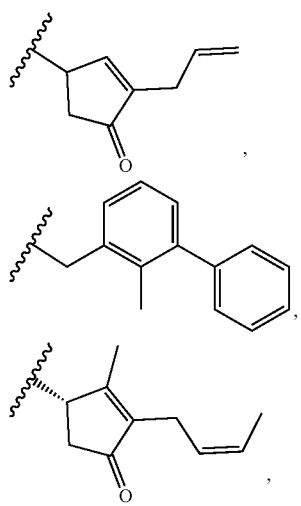
-continued
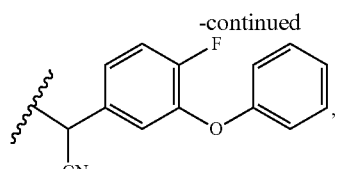,
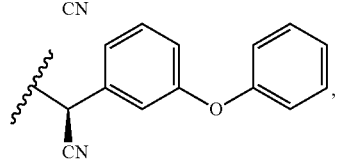,
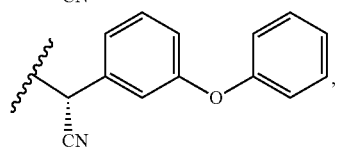,
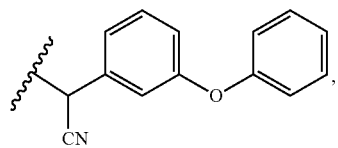,
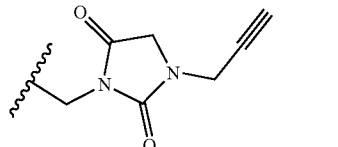,
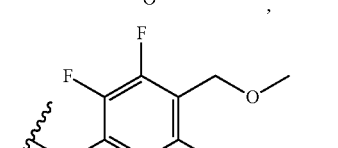,
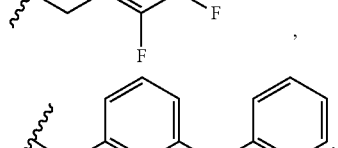,
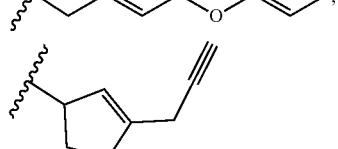,
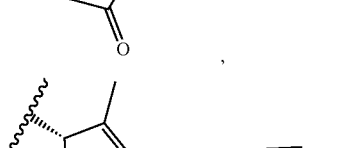,
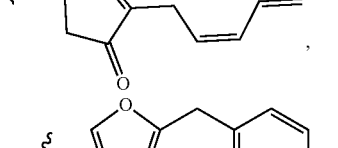,
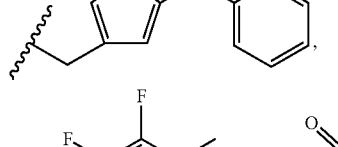,
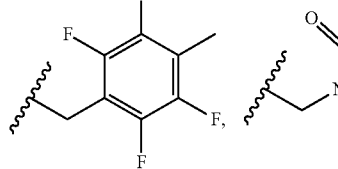 and -continued

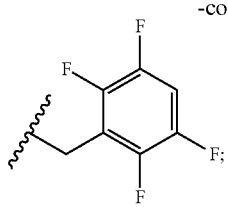

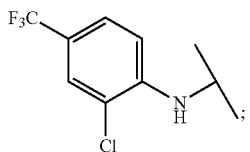

(III)

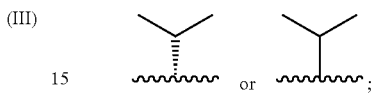

wherein:
R is selected from the group consisting of

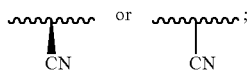

and $R_3$ is

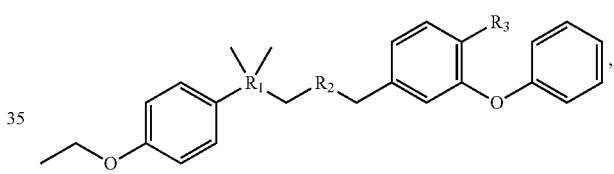

and (IV)

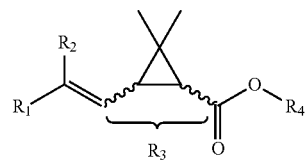

wherein:
$R_1$ is selected from the group consisting of (V)

wherein:
$R_1$ is C or Si;
$R_2$ is O or $CH_2$; and
$R_3$ is H or F.

In a preferred embodiment, the one or more pyrethroids are selected from the group consisting of those compounds of Tables 2-5, below.

TABLE 2

| Compound | $R_1$ | $R_2$ | $R_3$ | $R_4$ |
|---|---|---|---|---|
| allethrin | —$CH_3$ | —$CH_3$ | | |

TABLE 2-continued
| Compound | R₁ | R₂ | R₃ | R₄ |
|---|---|---|---|---|
| bifenthrin | —CF₃ | —Cl | 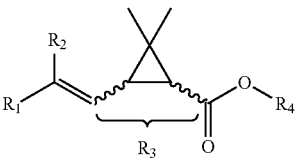 | 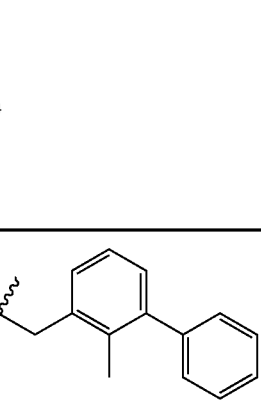 |
| cinerin I | —CH₃ | —CH₃ | 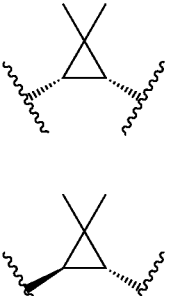 | 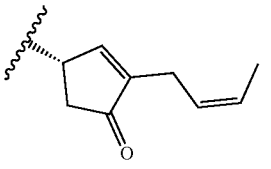 [SMILES: *[C@@H]1C=C(C/C=C\C)C(=O)C1] |
| cinerin II | 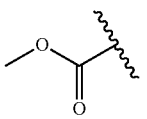 | —CH₃ | 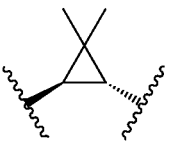 [SMILES: *[C@@H]1[C@@H](*)C1(C)C] | 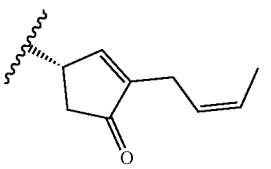 [SMILES: *[C@@H]1C=C(C/C=C\C)C(=O)C1] |
| cyfluthrin | —Cl | —Cl | 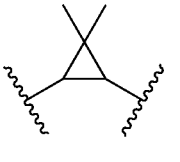 [SMILES: *C1C(*)C1(C)C] | 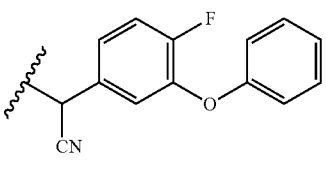 [SMILES: *C(C#N)c1ccc(F)c(Oc2ccccc2)c1] |
| cyfluthrin, β- | —Cl | —Cl | 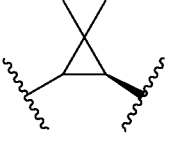 [SMILES: *C1[C@H](*)C1(C)C] | 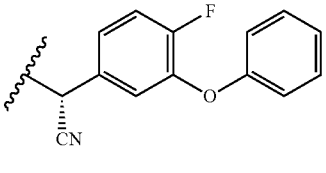 [SMILES: *[C@@H](C#N)c1ccc(F)c(Oc2ccccc2)c1] |
| cyhalothrin, γ | —CF₃ | —Cl | 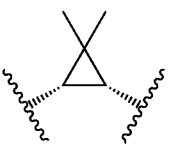 | 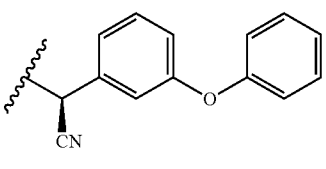 |
| cyhalothrin, λ | —CF₃ | —Cl | 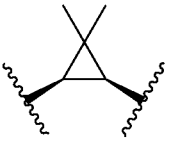 [SMILES: *[C@@H]1[C@H](*)C1(C)C] | 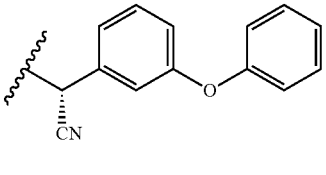 [SMILES: *[C@@H](C#N)c1cccc(Oc2ccccc2)c1] |
| cypermethrin | —Cl | —Cl | 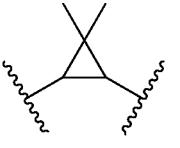 | 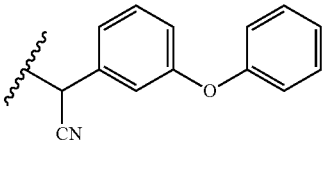 [SMILES: *C(C#N)c1cccc(Oc2ccccc2)c1] |

TABLE 2-continued

| Compound | R₁ | R₂ | R₃ | R₄ |
|---|---|---|---|---|
| cypermethrin, ζ- | —Cl | —Cl | cyclopropyl | phenoxyphenyl-CH(CN)— |
| cyphenothrin | —CH₃ | —CH₃ | cyclopropyl | phenoxyphenyl-CH(CN)— |
| cyphenothrin, d-d-T- | —CH₃ | —CH₃ | cyclopropyl (stereo) | phenoxyphenyl-CH(CN)— |
| deltamethrin | —Br | —Br | cyclopropyl (stereo) | phenoxyphenyl-CH(CN)— |
| imiprothrin | —CH₃ | —CH₃ | cyclopropyl | imidazolidine-2,4-dione-N-propargyl |
| metofluthrin | —CH₃ | —H | cyclopropyl | 2,3,5,6-tetrafluoro-4-(methoxymethyl)phenyl |
| permethrin | —Cl | —Cl | cyclopropyl | 3-phenoxybenzyl |
| permethrin, 1-RS-cis- | —Cl | —Cl | cyclopropyl (stereo) | 3-phenoxybenzyl |

TABLE 2-continued
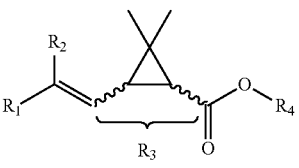
| Compound | R₁ | R₂ | R₃ | R₄ |
|---|---|---|---|---|
| prallethrin | —CH₃ | —CH₃ |  | 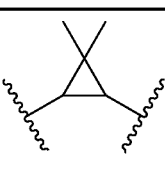 |
| pyrethrin I | —CH₃ | —CH₃ | 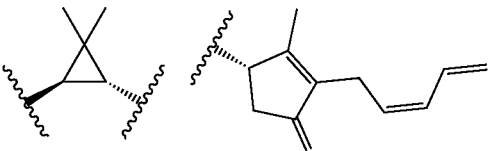 | 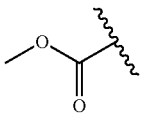 |
| pyrethrin II | 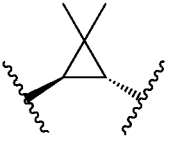 [SMILES: *[C@@H]1[C@@H](*)C1(C)C] | —CH₃ | 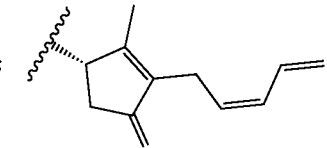 | 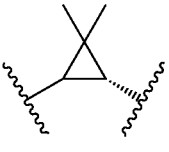 [SMILES: *[C@@H]1[C@H](*)C1(C)C] |
| sumithrin | —CH₃ | —CH₃ | 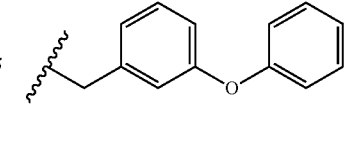 | 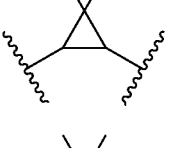 |
| resmethrin | —CH₃ | —CH₃ | 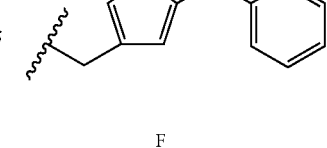 | 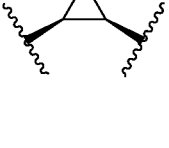 |
| tefluthrin | —CF₃ | —Cl | 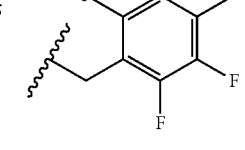 | 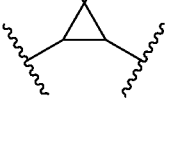 |
| tetramethrin | —CH₃ | —CH₃ | 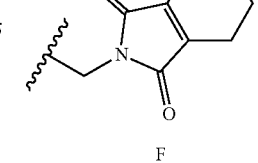 | 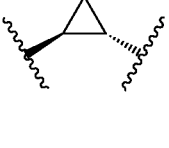 |
| transfluthrin | —Cl | —Cl | | 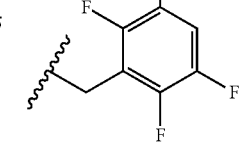 |

TABLE 3
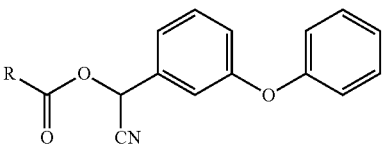
| Compound | R |
|---|---|
| fenpropathrin | 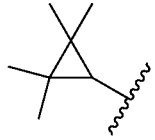 [SMILES: *C1C(C)(C)C1(C)C] |
| tralomethrin | 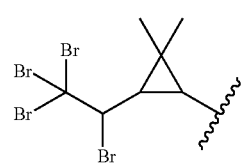 [SMILES: *C1C(C(Br)C(Br)(Br)Br)C1(C)C] |
TABLE 4
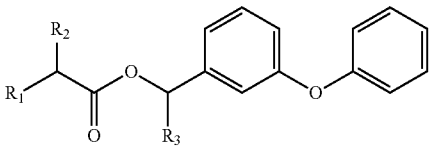
| Compound | $R_1$ | $R_2$ | $R_3$ |
|---|---|---|---|
| esfenvalerate | 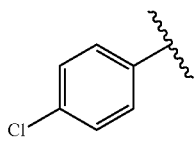 [SMILES: *c1ccc(Cl)cc1] |  |  |
| fenvalerate | 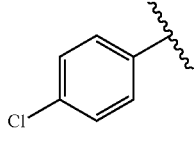 [SMILES: *c1ccc(Cl)cc1] |  |  |
| flucythrinate | 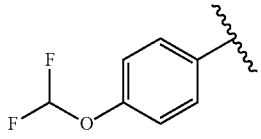 [SMILES: *c1ccc(OC(F)F)cc1] |  |  |
| fluvalinate, τ- | 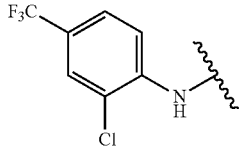 [SMILES: *Nc1ccc(C(F)(F)F)cc1Cl] |  |  |

TABLE 5

[Chemical structure diagram showing a compound with R1, R2, R3 substituents, ethoxy-phenyl group, and phenoxy-phenyl group]

| Compound | R₁ | R₂ | R₃ |
|---|---|---|---|
| etofenprox | C | O | H |
| silafluofen | Si | CH₂ | F |

In a preferred embodiment, the one or more pyrethroids are selected from the group consisting of allethrin, bifenthrin, beta-cyfluthrin, cyfluthrin, cypermethrin, d,d,trans-cyphenothrin, cyphenothrin, deltamethrin, esfenvalerate, etofenprox, fenpropathrin, fenvalerate, flucythrinate, tau-fluvalinate, lambda-cyhalothrin, gamma-cyhalothrin, imiprothrin, metofluthrin, 1RS cis-permethrin, permethrin, prallethrin, pyrethrum, resmethrin, silafluofen, sumithrin (d-phenothrin), tefluthrin, tetramethrin, tralomethrin, transfluthrin and zeta-cypermethrin. In a more preferred embodiment, the one or more pyrethroids is fenpropathrin. In another embodiment, the one or more pyrethroids does not include pyrethrum. In another embodiment, the mixtures of the present invention are free of gamma cyhalothrin or bifenthrin.

As used herein the term "pyrethrum" refers to a composition that includes cinerin including cinerin I and cinerin II and pyrethrin including pyrethrin I and pyrethrin II.

As used herein the term "C8, 9, 10 fatty acids" refers to a mixture of octanoic, nonanoic and decanoic fatty acids. Octanoic, or caprylic acid, is an eight-carbon saturated fatty acid. Nonanoic acid, or pelargonic acid, is a nine-carbon saturated fatty acid. Decanoic acid, or capric acid, is a ten-carbon saturated fatty acid. The C8, 9, 10 fatty acids have an equal amount of each fatty acid by weight percentage (about 33.3% each).

In another preferred embodiment, the ratio of one or more pyrethroids to one or more mectins is from about 1000:1 to about 1:1000, preferably from about 100:1 to about 1:100, more preferably from about 50:1 to 1:50, even more preferably from about 20:1 to about 1:20, yet even more preferably from about 10:1 to about 1:10, yet even more preferably from about 5:1 to about 1:5, yet even more preferably from about 2.6:1 to about 1:2 and yet even more preferably from about 1.3:1 to about 1:1.3 and yet even more preferably at about 1.3:1 or 2.6:1.

In another embodiment, the ratio of one or more pyrethroids to one or more mectins is from about 1000:1 to about 1.1:1, preferably from about 100:1 to about 1.1:1, more preferably from about 50:1 to about 1.1:1, even more preferably from about 20:1 to about 1.1:1, yet even more preferably from about 10:1 to about 1.1:1, yet even more preferably from about 5:1 to about 1.1:1, yet even more preferably from about 3.3:1 to about 1.1:1, yet even more preferably from about 2.67:1 to about 1.1:1, yet even more preferably from about 2:1 to about 1.1:1, yet even more preferably from about 1.3:1 to about 1.1:1 and most preferably from about 3.3:1 to about 1.3:1.

In another embodiment, the ratio of one or more pyrethroids to one or more mectins is from about 1:1.1 to about 1:1000, preferably from about 1:1.1 to about 1:100, more preferably from about 1:1.1 to about 1:50, even more preferably from about 1:1.1 to about 1:20, yet even more preferably from about 1:1.1 to about 1:10, yet even more preferably from about 1:1.1 to about 1:5, yet even more preferably from about 1:1.1 to about 1:2 and yet even more preferably from about 1:1.1 to about 1:1.3. In another embodiment the ratio of one or more pyrethroids to one or more mectins is about 1.33:1 or about 1:1.1. The ratio of one or more pyrethroids to one or more mectins is based on a weight ratio.

In another preferred embodiment, the ratio of one or more pyrethroids to C8, 9, 10 fatty acids is from about 1000:1 to about 1:1000, preferably from about 100:1 to about 1:100, more preferably from about 50:1 to 1:50, even more preferably from about 20:1 to about 1:20, yet even more preferably from about 10:1 to about 1:10, yet even more preferably from about 5:1 to about 1:5, yet even more preferably from about 2:1 to about 1:2 and yet even more preferably from about 1.3:1 to about 1:1.3.

In another embodiment, the ratio of one or more pyrethroids to C8, 9, 10 fatty acids is from about 1000:1 to about 1.1:1, preferably from about 100:1 to about 1.1:1, more preferably from about 50:1 to about 1.1:1, even more preferably from about 20:1 to about 1.1:1, yet even more preferably from about 10:1 to about 1.1:1, yet even more preferably from about 5:1 to about 1.1:1 and yet even more preferably from about 5:1 to about 4:1.

In another embodiment, the ratio of one or more pyrethroids to C8, 9, 10 fatty acids is from about 1:1.1 to about 1:1000, preferably from about 1:1.1 to about 1:100, more preferably from about 1:1.1 to about 1:50, even more preferably from about 1:1.1 to about 1:20, yet even more preferably from about 1:1.1 to about 1:10, yet even more preferably from about 1:1.1 to about 1:5, yet even more preferably from about 1:1.1 to about 1:2 and yet even more preferably from about 1:1.1 to about 1:1.3. In another embodiment the ratio of one or more pyrethroids to C8, 9, 10 fatty acids is or about 1:1. The ratio of one or more pyrethroids to C8, 9, 10 fatty acids is based on a weight ratio.

In another preferred embodiment, the ratio of one or more mectins to C8, 9, 10 fatty acids is from about 1000:1 to about 1:1000, preferably from about 100:1 to about 1:100, more preferably from about 50:1 to 1:50, even more preferably from about 20:1 to about 1:20, yet even more preferably from about 10:1 to about 1:10, yet even more preferably from about 5:1 to about 1:5, yet even more preferably from about 2:1 to about 1:2 and yet even more preferably from about 1.3:1 to about 1:1.3.

In another embodiment, the ratio of one or more mectins to C8, 9, 10 fatty acids is from about 1000:1 to about 1.1:1, preferably from about 100:1 to about 1.1:1, more preferably from about 50:1 to about 1.1:1, even more preferably from about 20:1 to about 1.1:1, yet even more preferably from about 10:1 to about 1.1:1, yet even more preferably from about 5:1 to about 1.1:1, yet even more preferably from about 2:1 to about 1.1:1 and yet even more preferably from about 1.5:1 to about 1.1:1.

In another embodiment, the ratio of one or more mectins to C8, 9, 10 fatty acids is from about 1:1.1 to about 1:1000, preferably from about 1:1.1 to about 1:100, more preferably from about 1:1.1 to about 1:50, even more preferably from about 1:1.1 to about 1:20, yet even more preferably from about 1:1.1 to about 1:10, yet even more preferably from about 1:1.1 to about 1:5, yet even more preferably from about 1:1.1 to about 1:2 and yet even more preferably from about 1:1.1 to about 1:1.3. In another embodiment the ratio of one or more mectins to C8, 9, 10 fatty acids is about 1.5:1. The ratio of one or more mectins to C8, 9, 10 fatty acids is based on a weight ratio.

In another preferred embodiment, the ratio of one or more pyrethroids to one or more mectins to C8, 9, 10 fatty acids is from about 1000:1:1 to about 1:1:1000 or from about 1000:1:1 to about 1:1000:1 or from about 1:1000:1 to about 1:1:1000 or from about 1000:1000:1 to about 1:1000:1000 or from about 1000:1000:1 to about 1000:1:1000 or from about 1000:1:1000 to about 1:1000:1000, preferably from about 100:1:1 to about 1:1:100 or from about 100:1:1 to about 1:100:1 or from about 1:100:1 to about 1:1:100 or from about 100:100:1 to about 1:100:100 or from about 100:100:1 to about 100:1:100 or from about 100:1:100 to about 1:100:100, more preferably from about 50:1:1 to about 1:1:50 or from about 50:1:1 to about 1:50:1 or from about 1:50:1 to about 1:1:50 or from about 50:50:1 to about 1:50:50 or from about 50:50:1 to about 50:1:50 or from about 50:1:50 to about 1:50:50, even more preferably from about 20:1:1 to about 1:1:20 or from about 20:1:1 to about 1:20:1 or from about 1:20:1 to about 1:1:20 or from about 20:20:1 to about 1:20:20 or from about 20:20:1 to about 20:1:20 or from about 20:1:20 to about 1:20:20, yet even more preferably from about 10:1:1 to about 1:1:10 or from about 10:1:1 to about 1:10:1 or from about 1:10:1 to about 1:1:10 or from about 10:10:1 to about 1:10:10 or from about 10:10:1 to about 10:1:10 or from about 10:1:10 to about 1:10:10, yet even more preferably from about 5:1:1 to about 1:1:5 or from about 5:1:1 to about 1:5:1 or from about 1:5:1 to about 1:1:5 or from about 5:5:1 to about 1:5:5 or from about 5:5:1 to about 5:1:5 or from about 5:1:5 to about 1:5:5 and yet even more preferably from about 2:1:1 to about 1:1:2 or from about 2:1:1 to about 1:2:1 or from about 1:2:1 to about 1:1:2 or from about 2:2:1 to about 1:2:2 or from about 2:2:1 to about 2:1:2 or from about 2:1:2 to about 1:2:2. Ina most preferred embodiment the ratio of one or more pyrethroids to one or more mectins to C8, 9, 10 fatty acids is from about from about 5:1.5:1 to about 2:1.5:1. The ratio of one or more pyrethroids to one or more mectins to C8, 9, 10 fatty acids is based on a weight ratio.

In a more preferred embodiment, the present invention is directed to a pesticidal mixture comprising abamectin and fenpropathrin, preferably at a weight ratio of about 1:1.33 or about 1.2.67 abamectin to fenpropathrin.

In another more preferred embodiment, the present invention is directed to a pesticidal mixture comprising abamectin and permethrin, preferably at a weight ratio of about 1:3.33 abamectin to permethrin.

In another more preferred embodiment, the present invention is directed to a pesticidal mixture comprising abamectin and pyrethrum, preferably at a weight ratio of about 1:3.33 abamectin and pyrethrum.

In another more preferred embodiment, the present invention is directed to a pesticidal mixture comprising ivermectin and fenpropathrin, preferably at a weight ratio of about 1:1.33 or about 1.2.67 ivermectin and fenpropathrin.

In another more preferred embodiment, the present invention is directed to a pesticidal mixture comprising ivermectin and permethrin, preferably at a weight ratio of about 1:3.33 ivermectin and permethrin.

In another more preferred embodiment, the present invention is directed to a pesticidal mixture comprising ivermectin and pyrethrum, preferably at a weight ratio of about 1:3.33 ivermectin and pyrethrum.

In another more preferred embodiment, the present invention is directed to a pesticidal mixture comprising abamectin, fenpropathrin and C8, 9, 10 fatty acids, preferably at a weight ratio of about 1.5:2:1 or about 1.5:4:1 abamectin to fenpropathrin to C8, 9, 10 fatty acids.

In another more preferred embodiment, the present invention is directed to a pesticidal mixture comprising abamectin, permethrin and C8, 9, 10 fatty acids, preferably at a weight ratio of about 1.5:5:1 abamectin to permethrin to C8, 9, 10 fatty acids.

In another more preferred embodiment, the present invention is directed to a pesticidal mixture comprising abamectin, pyrethrum and C8, 9, 10 fatty acids, preferably at a weight ratio of about 1.5:5:1 abamectin to pyrethrum to C8, 9, 10 fatty acids.

In another more preferred embodiment, the present invention is directed to a pesticidal mixture comprising ivermectin, fenpropathrin and C8, 9, 10 fatty acids preferably at a weight ratio of about 1.5:2:1 or about 1.5:4:1 ivermectin to fenpropathrin to C8, 9, 10 fatty acids.

In another more preferred embodiment, the present invention is directed to a pesticidal mixture comprising ivermectin, permethrin and C8, 9, 10 fatty acids, preferably at a weight ratio of about 1.5:5:1 ivermectin to permethrin to C8, 9, 10 fatty acids.

In another more preferred embodiment, the present invention is directed to a pesticidal mixture comprising ivermectin, pyrethrum and C8, 9, 10 fatty acids, preferably at a weight ratio of about 1.5:5:1 ivermectin to pyrethrum to C8, 9, 10 fatty acids.

In another embodiment, the one or more mectins of the present invention may exist in a composition at an effective amount. In a preferred embodiment, an effective amount of one or more pyrethroids is a concentration of from about 0.1% to about 50% w/w, preferably from about 0.1% to about 10% w/w, even more preferably from about 0.1% to about 5% w/w, yet even more preferably from about 1% to about 3% w/w and yet even more preferably at about 1.5% w/w.

In another embodiment, the one or more pyrethroids of the present invention may exist in a composition at an effective amount. In a preferred embodiment, an effective amount of one or more pyrethroids is a concentration of from about 0.1% to about 50% w/w, preferably from about 0.1% to about 10% w/w, even more preferably from about 0.1% to about 5% w/w, yet even more preferably from about 2% to about 5% w/w and yet even more preferably at about 2.0%, 4.0% or about 5.0% w/w.

In another embodiment, the C8, 9, 10 fatty acids of the present invention may exist in a composition at an effective amount. In a preferred embodiment, an effective amount of the C8, 9, 10 fatty acids is a concentration of from about 0.1% to about 50% w/w, preferably from about 0.1% to about 10% w/w, even more preferably from about 0.1% to about 10% w/w, yet even more preferably from about 0.1% to about 5% w/w and yet even more preferably at about 1.0% w/w.

In another embodiment, the present invention is directed to a method of controlling a pest comprising applying an effective amount of the mixtures of the present invention to the pest or an area in need of pest control.

In another embodiment, the present invention is directed to a method of controlling a mosquito comprising applying sequentially or concurrently an effective amount of one or more mectins selected from abamectin and ivermectin and an effective amount of one or more pyrethroids selected from fenpropathrin, permethrin and pyrethrum to the mosquito or an area in need of mosquito control.

The mixtures of the present invention can be applied by any convenient means. Those skilled in the art are familiar with the modes of application including but not limited to, spraying, brushing, soaking, granule application, pressurized liquids (aerosols), fogging, bait and/or side-dressing. Spraying includes space sprays. Space sprays include aerosols and thermal fog spray.

Applying the mixtures of the present invention to the pest include incorporating the mixtures of the present invention into a composition that may be ingested by the pest.

As used herein, "to control" a pest or "controlling" pest(s) refers to killing, incapacitating, repelling, or otherwise decreasing the negative impact of the pest on plants or animals to a level that is desirable to the grower, applicator or user.

As used herein, "an area in need of pest control" refers to any area that the pest is present during any life stage. An area in need of pest control includes, but is not limited to: a) the plants that the pest is living on and/or the surrounding soil; b) an area where plants are grown, harvested, or in gardens, fields, greenhouses; c) indoor areas of human habitation such as residential buildings and commercial buildings including single family dwellings, hotels, daycares, libraries, multi-family residences, jails, hostels, wash rooms, hallways, including hotels, and hospitals, or transportation vehicles; d) outdoor areas around human habitation including areas near mosquito development sites and various indoor surfaces and structures, such as furniture including beds and furnishings including books, etc; and e) fabrics including tents, bed nets, clothing and the like.

Pests that may be controlled by methods of the present invention include, but are not limited to, arthropods. Arthropods include insects, centipedes, millipedes and arachnids.

In one embodiment, the arthropods controlled are resistant to pyrethroids or mectins.

In a preferred embodiment, the arthropods are insects. In a more preferred embodiment, the insect is a mosquito. As used herein, "mosquito" refers to insects that belong to the Family Culicidae. Example Subfamilies of mosquitoes include Anophelinae and Culicinae. Example Genera of mosquitoes include *Anopheles, Culex, Aedes, Ochlerotatus, Psorophora, Culiseta, Coquillettidia* and *Mansonia*. Example species of mosquitoes include *Aedes aegypti, Aedes albopictus, Aedes dorsalis, Ochlerotatus nigromaculis* (also known as *Aedes nigromaculis*), *Ochlerotatus vexans* (also known as *Aedes vexans*), *Ochlerotatus sollicitans* (also known as *Aedes sollicitans*), *Ochlerotatus melanimon* (also known as *Aedes melanimon*), *Ochlerotatus taeniorhynchus* (also known as *Aedes taeniorhynchus*), *Aedes triseriatus, Aedes, sierrensis, Aedes furcifer, Anopheles gambiae* including Mopti and Savannah subspecies, *Anopheles quadrimaculatus, Anopheles freeborni, Anopheles darlingi, Anopheles pseudopunctipennis, Anopheles albimanus, Anopheles stephensi, Anopheles funestus, Anopheles nili, Anopheles coluzzii, Anopheles arabiensis, Anopheles melas, Culex quinquefasciatus, Culex pipiens* (also known as *Culex fatigans*), *Culex tarsalis, Culex restuans, Culex nigripalpus, Culex salinarius, Culex poicilipes, Culex antennatus, Culex neavei, Culiseta melanura, Psorophora columbiae, Psorophora ciliata, Coquillettidia pertubans, Mansonia africana* and *Mansonia uniformis*.

In a more preferred embodiment, the mosquito is of a genera selected from the group consisting of *Culex, Aedes, Anopheles* and a combination thereof. In an even more preferred embodiment, the mosquito is of a genera selected from the group consisting of *Culex, Aedes* and a combination thereof.

In an even more preferred embodiment, the mosquito is selected from the group consisting of *Aedes aegypti, Culex quinquefasciatus, Anopheles quadrimaculatus* and a combination thereof. In a yet even more preferred embodiment, the mosquito is *Aedes aegypti* or *Culex quinquefasciatus*.

In another embodiment, the mixtures of the present invention provide initial arthropod control. In another embodiment, the mixtures of the present invention provide residual arthropod control.

In another embodiment, the one or more mectins may be applied at a rate of from about 0.01 to about 100 grams per hectare ("g/HA"), preferably from about 0.1 to about 100 g/HA, more preferably from about 0.1 to about 10 g/HA, even more preferably from about 0.1 to about 5 g/HA, even more preferably from about 0.1 to about 2 g/HA, yet even more preferably from about 0.5 to about 2 g/HA, yet even more preferably from about 0.75 to about 1.5 g/HA and yet even more preferably at about 1 g/HA.

In another embodiment, the one or more pyrethroids may be applied at a rate of from about 0.01 to about 100 grams per hectare ("g/HA"), preferably from about 0.1 to about 100 g/HA, more preferably from about 0.1 to about 10 g/HA, even more preferably from about 0.1 to about 5 g/HA, even more preferably from about 1 to about 5 g/HA, yet even more preferably from about 1 to about 4 g/HA, yet even more preferably from about 2 to about 3 g/HA and yet even more preferably at about 2.68 g/HA.

In another embodiment, the C8, 9, 10 fatty acids may be applied at a rate of from about 0.01 to about 10 grams per hectare ("g/HA"), preferably from about 0.01 to about 1 g/HA, more preferably from about 0.1 to about 1 g/HA, even more preferably from about 0.4 to about 0.9 g/HA, even more preferably from about 0.5 to about 0.8 g/HA, yet even more preferably from about 0.6 to about 0.7 g/HA, yet even more preferably at about 0.67 g/HA.

As used herein, all numerical values relating to amounts, weight percentages and the like are defined as "about" or "approximately" each particular value, namely, plus or minus 10%. For example, the phrase "about 5% w/w" is to be understood as "from 4.5% to 5.5% w/w." Therefore, amounts within 10% of the claimed values are encompassed by the scope of the claims.

As used herein, "composition" refers to one or more active ingredients in a carrier. The carrier may be a liquid, a semi-solid, a solid or a gas and may contain additional ingredients. For example, a bait is a suitable carrier for the present invention.

The term "effective amount" means the amount of the mixture that will control the target pest. The "effective amount" will vary depending on the mixture concentration, the type of pest(s) being treated, the severity of the pest infestation, the result desired, and the life stage of the pest during treatment, among other factors. Thus, it is not always possible to specify an exact "effective amount." However, an appropriate "effective amount" in any individual case may be determined by one of ordinary skill in the art.

The articles "a," "an" and "the" are intended to include the plural as well as the singular, unless the context clearly indicates otherwise. For example, the methods of the present invention are directed to controlling "pest", but this can include control of a multiple pests (such as a more than one insect or more than one insect species or more than one mite or more than one mite species).

The disclosed embodiments are simply embodiments of the inventive concepts disclosed herein and should not be considered as limiting unless the claims expressly state otherwise.

The following examples are intended to illustrate the present invention and to teach one of ordinary skill in the art how to use the formulations of the invention. They are not intended to be limiting in any way.

EXAMPLES

Example 1-Control of *Aedes aegypti* Having a Single KDR Mutation by a Mixture of Fenpropathrin and Abamectin or Ivermectin Method In this bioassay, a wind tunnel bioassay was performed in New Mexico in July 2017. *Aedes aegypti* that were known to be resistant (single knockdown resistance ("KDR") mutation) and susceptible to permethrin were used in the studies. The following solutions were applied to adult *A. aegypti* mosquitoes: 1) 1.5% abamectin; 2) 1.5% ivermectin; 3) 2% fenpropathrin; 4) a mixture of 2% fenpropathrin and 1.5% abamectin; 5) a mixture of 2% fenpropathrin and 1.5% abamectin; 6) a mixture of 2% fenpropathrin and 1.5% ivermectin; and 7) a mixture of 2% fenpropathrin and 1.5% ivermectin.

To determine if the mixtures provided unexpected results, the observed combined efficacy ("OCE") was divided by the expected combined efficacy ("ECE") wherein the expected ECE is calculated by the Abbott method:

$$ECE = A + B - (AB/100),$$

wherein ECE is the expected combined efficacy and in which A and B are the percent control given by the single active ingredients. If the ratio between the OCE of the mixture and the ECE of the mixture is greater than 1, then greater than expected interactions are present in the mixture. (Gisi, Synergistic Interaction of Fungicides in Mixtures, The American Phytopathological Society, 86:11, 1273-1279, 1996). Results can be found in Table 6, below.

TABLE 6

|  | Permethrin Susceptible *A. aegypti* % Mortality | OCE:ECE | Permethrin Resistant *A. aegypti* % Mortality | OCE:ECE |
|---|---|---|---|---|
| Untreated Control | 2 | — | 1 | — |
| 1.5% abamectin | 100 | — | 91.3 | — |
| 1.5% ivermectin | 100 | — | 62.9 | — |
| 2.0% fenpropathrin | 99.6 | — | 75.8 | — |
| 2% fenpropathrin + 1.5% abamectin | 100 | 1.0 | 100 | 1.0 |
| 2% fenpropathrin + 1.5% ivermectin | 100 | 1.0 | 100 | 1.1 |

Results

As shown in Table 6, both 1.5% abamectin and 1.5% ivermectin provided 100% control of *A. aegypti* known to be susceptible to permethrin.

Further, in regard to *A. aegypti* known to be resistant to permethrin, 1.5% abamectin provided 91% control, 1.5% ivermectin provided 64% control and 2.0% fenpropathrin provided 76% control. This control is enhanced when fenpropathrin is mixed with either abamectin or ivermectin. Specifically, the mixture of 2.0% fenpropathrin and 1.5% abamectin or the mixture of 2.0% fenpropathrin and 1.5% ivermectin provided 100% control. For the mixture of ivermectin and fenpropathrin this control is enhanced to an unexpected level. Specifically, a mixture of ivermectin and fenpropathrin provided an OCE:ECE ratio of 1.1.

Example 2—Control of *Aedes aegypti* Having a Double KDR Mutation by a Mixture of Fenpropathrin and Abamectin Method In this bioassay, a wind tunnel bioassay was performed in New Mexico in January 2020. *Aedes aegypti* that were known to be resistant (double knockdown resistance ("KDR") mutation) and susceptible to permethrin were used in the studies. The following solutions were applied to adult *A. aegypti* mosquitoes: a mixture of 4% fenpropathrin, 1.5% abamectin and 1% C8, 9, 10 fatty acids. Percent mortality was recorded at 15 minutes ("Min"), 1 hour ("Hr"), 24 hours and 48 hours. Results are shown in Table 7, below.

TABLE 7

|  | Permethrin Susceptible *A. aegypti* | | | | Permethrin Resistant *A. aegypti* | | | |
|---|---|---|---|---|---|---|---|---|
|  | 15 Min | 1 Hr | 24 Hr | 48 Hr | 15 Min | 1 Hr | 24 Hr | 48 Hr |
|  | % Mortality | | | | % Mortality | | | |
| Untreated Control | 0 | 0 | 0 | 0 | 0 | 0 | 0 | 1 |
| 4.0% fenpropathrin + 1.5% abamectin + 1% C8, 9, 10 fatty acids | 90.25 | 99.75 | 100 | 100 | 0 | 6.75 | 90 | 92.25 |

Result

As seen in Table 7, above, the application of a mixture of 4% fenpropathrin, 1.5% abamectin and 1% C8, 9, 10 fatty acids resulted in 92% control of *A. aegypti* having a double KDR mutation after 48 hours. This result is surprising as the *A. aegypti* having a double KDR mutation are up to 10-fold more resistant to pyrethroids than single KDR mutants.

Example 3-Control of *Culex quinquefasciatus* by a Mixture of Fenpropathrin and Abamectin or Ivermectin Method In this bioassay, a wind tunnel bioassay was performed in New Mexico in August 2019. *Culex quinquefasciatus* that were known to be resistant and susceptible to permethrin were used in the studies. The following solutions were applied to adult *C. quinquefasciatus* mosquitoes: 1) a mixture of 2% fenpropathrin, 1.5% ivermectin and 1% C8, 9, 10 fatty acids; 5) a mixture of 4% fenpropathrin, 1.5% abamectin and 1% C8, 9, 10 fatty acids; 6) a mixture of 4% fenpropathrin, 1.5% ivermectin and 1% C8, 9, 10 fatty acids. Percent mortality was recorded at 15 minutes, 1 hour, 24 hours and 48 hours. Results can be found in Table 8, below.

TABLE 8

|  | Permethrin Susceptible *C. quinquefasciatus* | | | | Permethrin Resistant *C. quinquefasciatus* | | | |
| --- | --- | --- | --- | --- | --- | --- | --- | --- |
|  | 15 Min | 1 Hr | 24 Hr | 48 Hr | 15 Min | 1 Hr | 24 Hr | 48 Hr |
|  | % Mortality | | | | % Mortality | | | |
| 2.0% fenpropathrin + 1.5% ivermectin + 1% C8, 9, 10 fatty acids | 86.6 | 99.7 | 100.0 | 100.0 | 20.9 | 83.8 | 99.1 | 100.0 |
| 4.0% fenpropathrin + 1.5% abamectin + 1% C8, 9, 10 fatty acids | 100.0 | 100.0 | 100.0 | 100.0 | 90.0 | 99.7 | 100.0 | 100.0 |
| 4.0% fenpropathrin + 1.5% ivermectin + 1% C8, 9, 10 fatty acids | 97.5 | 100.0 | 100.0 | 100.0 | 8.8 | 91.3 | 90.0 | 88.8 |

Result

As seen in Table 8, above, the application of a mixture of 2% or 4% fenpropathrin, 1.5% abamectin or ivermectin and 1% C8, 9, 10 fatty acids resulted in 100% control of *C. quinquefasciatus* that were known to be resistant to permethrin in about 1 hour. This control was maintained after 48 hours. This result is important as *C. quinquefasciatus* resistant strains have a metabolic resistance to pyrethroids. Specifically, when permethrin is applied to *C. quinquefasciatus* resistant strains the mosquito appears to be controlled after 1 hour but then wake up around 48 hours later after they have metabolized the permethrin.

Example 4—Control of *Culex quinquefasciatus* by a Mixture of Permethrin and Abamectin or Ivermectin Method In this bioassay, a wind tunnel bioassay was performed in New Mexico in March 2020. *C. quinquefasciatus* that were known to be resistant and susceptible to permethrin were used in the studies. The following solutions were applied to adult *C. quinquefasciatus* mosquitoes: 1) 5% permethrin; 2) a mixture of 5% permethrin and, 1.5% abamectin; 3) a mixture of 5% permethrin, 1.5% abamectin and 1% C8, 9, 10 fatty acids; 4) a mixture of 5% permethrin and 1.5% ivermectin; and 5) a mixture of 5% permethrin, 1.5% ivermectin and 1% C8, 9, 10 fatty acids. Percent mortality was recorded at 15 minutes, 1 hour, 24 hours and 48 hours. Results can be found in Table 9, below.

TABLE 9

|  | Permethrin Susceptible C. quinquefasciatus | | | | Permethrin Resistant C. quinquefasciatus | | | |
| --- | --- | --- | --- | --- | --- | --- | --- | --- |
|  | 15 Min | 1 Hr | 24 Hr | 48 Hr | 15 Min | 1 Hr | 24 Hr | 48 Hr |
|  | % Mortality | | | | % Mortality | | | |
| 5% permethrin | 65 | 100 | 100 | 100 | 0 | 78.8 | 65 | 66.3 |
| 5% permethrin + 1.5% abamectin | 100 | 100 | 100 | 100 | 0 | 77.5 | 91.2 | 100 |
| 5% permethrin + 1.5% abamectin + 1% C8, 9, 10 fatty acids | 77.2 | 99.7 | 100 | 100 | 18.1 | 98.8 | 99.7 | 91.3 |
| 5% permethrin + 1.5% ivermectin | 90 | 100 | 100 | 100 | 7.5 | 87.5 | 100 | 100 |
| 5% permethrin + 1.5% ivermectin + 1% C8, 9, 10 fatty acids | 100 | 100 | 100 | 100 | 13.8 | 92.5 | 100 | 100 |

Result

As seen in Table 9, above, application of 5% permethrin resulted in only 66.3% control of the resistant *C. quinquefasciatus* mosquitoes after 48 hours. However, the application of a mixture of 5% permethrin and 1.5% abamectin resulted in 91.3% control after 48 hours. This control was enhanced to 100% by the addition of 1% C8, 9, 10 fatty acids. Further, the application of a mixture of 5% permethrin and 1.5% ivermectin resulted in 100% control after 24 hours. This control was not negatively affected by the addition of 1% C8, 9, 10 fatty acids.

Example 5—Control of *Culex quinquefasciatus* by a Mixture of Pyrethrum and Abamectin or Ivermectin Method In this bioassay, a wind tunnel bioassay was performed in New Mexico in March 2020. *C. quinquefasciatus* that were known to be resistant and susceptible to permethrin were used in the studies. The following solutions were applied to adult *C. quinquefasciatus* mosquitoes: 1) 1.5% abamectin; 2) 1.5% ivermectin; 3) 5% pyrethrum; 4) a mixture of 5% pyrethrum and 1.5% abamectin; and 5) a mixture of 5% pyrethrum and 1.5% ivermectin. Percent mortality was recorded at 15 minutes, 1 hour, 24 hours and 48 hours. Results can be found in Table 10, below.

TABLE 10

|  | Permethrin Susceptible C. quinquefasciatus | | | | Permethrin Resistant C. quinquefasciatus | | | |
| --- | --- | --- | --- | --- | --- | --- | --- | --- |
|  | 15 Min | 1 Hr | 24 Hr | 48 Hr | 15 Min | 1 Hr | 24 Hr | 48 Hr |
|  | % Mortality | | | | % Mortality | | | |
| 1.5% abamectin | 15 | 73.8 | 91.3 | 92.5 | 0 | 26.3 | 78.8 | 80 |
| 1.5% ivermectin | 5 | 62.5 | 100 | 100 | 0 | 42.5 | 88.8 | 91.3 |
| 5% pyrethrum | 100 | 100 | 93.8 | 93.8 | 60 | 70 | 46.3 | 46.3 |
| 5% permethrin + 1.5% abamectin | 88.8 | 100 | 100 | 100 | 46.9 | 87.5 | 96.9 | 96.9 |
| OCE:ECE Ratio | 0.9 | 1.0 | 1.0 | 1.0 | 0.8 | 1.1 | 1.1 | 1.1 |
| 5% pyrethrum + 1.5% ivermectin | 85.3 | 100 | 100 | 100 | 37.5 | 73.4375 | 93.4 | 95 |
| OCE:ECE Ratio | 0.9 | 1.0 | 1.0 | 1.0 | 0.6 | 0.9 | 1.0 | 1.0 |

Result

As seen in Table 10, above, application of 5% pyrethrum resulted in only 46.3% control of the resistant *C. quinquefasciatus* mosquitoes after 48 hours. Application of 1.5% abamectin or 1.5% ivermectin resulted in 80% and 91.3% control respectively. However, the application of a mixture of 5% pyrethrum and 1.5% abamectin resulted in 96.9% control after 24 hours. In fact, the application of a mixture of 5% permethrin and 1.5% abamectin resulted in control of permethrin resistant *C. quinquefasciatus* mosquitoes at 1 hour, 24 hours and 48 hours after application that was unexpected based on the application of either pesticide alone. Further, the application of a mixture of 5% pyrethrum and 1.5% ivermectin resulted in 95% control after 48 hours.

Example 6—Control of *Culex quinquefasciatus* by a Mixture of Fenpropathrin and Abamectin Method In this bioassay, an outdoor ultra-low volume study was performed in New Mexico in June 2020 and in Arizona in October 2020 *C. quinquefasciatus* (lab-reared) that were known to be susceptible to permethrin were used in the studies. A solution containing a mixture of 4% fenpropathrin, 1.5% abamectin and 1% C8, 9, 10 fatty acids of was applied as a fog to 18 cages with 20 adult female *C. quinquefasciatus* mosquitoes each (n=3) in an open field with low vegetation evenly spaced at 100, 200 and 300 feet from sprayer. Average windspeed was about 4 miles per hour. Percent mortality was recorded at 48 hours. Results can be found in Table 11, below.

TABLE 11

| % Mortality | 100 ft | 200 ft | 300 ft |
| --- | --- | --- | --- |
| New Mexico | 100% | 100% | 98.6% |
| Arizona | 100% | 100% | 99.2% |

Result

As seen in Table 11, above, application of 4% fenpropathrin and 1.5% abamectin resulted in nearly 100% of the susceptible *C. quinquefasciatus* mosquitoes. This efficacy was maintained at a distance of 300 feet from the fogger. Untreated control had less than 1.5% mortality.

Example 7—Control of Pyrethroid-Resistant *Culex quinquefasciatus* by a Mixture of Fenpropathrin and Abamectin Method In this bioassay, an outdoor ultra-low volume study was performed in New Mexico in August 2020 as in Example 6, above. *C. quinquefasciatus* that were known to be resistant (Yolo California Strain) or susceptible (lab-reared) to permethrin were used in the studies. Average windspeed was about 4 miles per hour. Percent mortality was recorded at 48 hours. Results can be found in Table 12, below.

TABLE 12

| % Mortality | 100 ft | 200 ft | 300 ft |
| --- | --- | --- | --- |
| Susceptible | 100% | 100% | 97.19% |
| Resistant | 99.4% | 97.7% | 86.55% |

Result

As seen in Table 12, above, application of 4% fenpropathrin and 1.5% abamectin resulted in nearly 100% of the susceptible *C. quinquefasciatus* mosquitoes. This efficacy was maintained at a distance of 300 feet from the sprayer. Further, application of 4% fenpropathrin and 1.5% abamectin resulted in nearly 100% of the resistant *C. quinquefasciatus* mosquitoes. Efficacy was only slightly less at a distance of 300 feet from the fogger. Untreated control had less than 1% mortality.

Example 8—Control of *Aedes aegypti* by a Mixture of Fenpropathrin and Abamectin Method In this bioassay, an outdoor ultra-low volume study was performed in California in July 2020 and Florida in October 2020 as in Example 6, above. *A. aegypti* (lab-reared) that were known to be susceptible to permethrin were used in the studies. Average windspeed was about 3.0 miles per hour. Percent mortality was recorded at 48 hours. Results can be found in Table 13, below.

TABLE 13

| % Mortality | 100 ft | 200 ft | 300 ft |
| --- | --- | --- | --- |
| California | 100% | 99.2% | 98.8% |
| Florida | 100% | 100% | 97.8% |

Result

As seen in Table 13, above, application of 4% fenpropathrin and 1.5% abamectin resulted in nearly 100% of the susceptible *A. aegypti* mosquitoes. This efficacy was maintained at a distance of 300 feet from the fogger. Untreated control had less than 1% mortality.

Example 9—Control of Pyrethroid-Resistant *Aedes aegypti* by a Mixture of Fenpropathrin and Abamectin Method In this bioassay, an outdoor ultra-low volume study was performed in New Mexico in September (Puerto Rican strain) and November (Floridian strain) 2020 as in Example 6, above. *A. aegypti* that were known to be resistant (Puerto Rican strain and Florida strain) or susceptible (lab-reared) to permethrin were used in the studies. Average windspeed was about 4 miles per hour. Percent mortality was recorded at 48 hours. Results can be found in Table 14, below.

TABLE 14

| % Mortality | 100 ft | 200 ft | 300 ft |
| --- | --- | --- | --- |
| Susceptible | 100% | 100% | 100% |
| Resistant-Puerto Rican Strain | 93.56% | 93.07% | 86.54% |
| Resistant-Floridian Strain | 100% | 98.88% | 90.37% |

Result

As seen in Table 14, above, application of 4% fenpropathrin and 1.5% abamectin resulted in 100% of the susceptible *A. aegypti* mosquitoes. This efficacy was maintained at a distance of 300 feet from the sprayer. Further, application of 4% fenpropathrin and 1.5% abamectin resulted in about 94% of the resistant *A. aegypti* Puerto Rican strain mosquitoes and nearly 100% control of the resistant *A. aegypti*

Floridian strain mosquitoes. Efficacy was only slightly less at a distance of 300 feet from the fogger. Untreated control had less than 1% mortality.

Example 10—Control of *Anopheles quadrimaculatus* by a Mixture of Fenpropathrin and Abamectin Method In this bioassay, an outdoor ultra-low volume study was performed in Texas in October 2020 as in Example 6, above. *A. quadrimaculatus* (lab-reared) that were known to be susceptible to permethrin were used in the studies. Average windspeed was about 3 miles per hour. Percent mortality was recorded at 48 hours. Results can be found in Table 15, below.

TABLE 15

| Distance | 100 ft | 200 ft | 300 ft |
|---|---|---|---|
| % Mortality | 100% | 99.2% | 99.4% |

Result

As seen in Table 15, above, application of 4% fenpropathrin and 1.5% abamectin resulted in nearly 100% of the susceptible *A. quadrimaculatus* mosquitoes. This efficacy was maintained at a distance of 300 feet from the fogger. Untreated control had less than 1% mortality.

What is claimed is:

1. A pesticidal mixture comprising one or more mectins selected from the group consisting of abamectin and ivermectin and one or more pyrethroids selected from the group consisting of fenpropathrin and permethrin, wherein the one or more mectins and the one or more pyrethroids are the only pesticidally active ingredients and wherein the weight ratio of the one or more pyrethroids to the one or more mectins is from about 3.3:1 to about 1.3:1.

2. The composition of claim 1, wherein the one or more mectins is abamectin and the one or more pyrethroids is permethrin and wherein the weight ratio of the one or more pyrethroids to the one or more mectins is about 3.3:1.

3. The composition of claim 1, wherein the one or more mectins is ivermectin and the one or more pyrethroids is fenpropathrin and wherein the weight ratio of the one or more pyrethroids to the one or more mectins is about 1.3:1.

4. A pesticidal mixture comprising one or more mectins selected from the group consisting of abamectin and ivermectin and one or more pyrethroids selected from the group consisting of fenpropathrin and permethrin, and C8-10 fatty acids, wherein the one or more mectins, the one or more pyrethroids and C8-10 fatty acids are the only pesticidally active ingredients and wherein the weight ratio of the one or more pyrethroids to the one or more mectins is from about 3.3:1 to about 1.3:1.

5. The composition of claim 4, wherein the one or more mectins is abamectin and the one or more pyrethroids is permethrin and wherein the weight ratio of the one or more pyrethroids to the one or more mectins is about 3.3:1.

6. The composition of claim 4, wherein the one or more mectins is ivermectin and the one or more pyrethroids is fenpropathrin and wherein the weight ratio of the one or more pyrethroids to the one or more mectins is about 1.3:1.

7. A method of controlling a mosquito comprising applying, sequentially or concurrently, an effective amount of a mixture of one or more mectins selected from abamectin and ivermectin and one or more pyrethroids selected from fenpropathrin and permethrin, to the mosquito or an area in need of mosquito control, wherein the one or more mectins and the one or more pyrethroids are the only pesticidally active ingredients and wherein the weight ratio of the one or more pyrethroids to the one or more mectins is from about 3.3:1 to about 1.3:1.

8. The method of claim 7, wherein the mosquito is selected from the group consisting of *Aedes aegypti, Culex quinquefasciatus, Anopheles quadrimaculatus* and a combination thereof.

9. The method of claim 7, wherein the mosquito is pyrethroid-resistant.

10. The method of claim 7, wherein the area in need of mosquito control is a bed net, a tent or an item of clothing.

11. The method of claim 7, wherein the control is residual.

12. The method of claim 7, wherein the mixture is applied by a technique selected from spraying, brushing and soaking.

13. The method of claim 7, wherein the one or more mectins is abamectin and the one or more pyrethroids is permethrin and wherein the weight ratio of the one or more pyrethroids to the one or more mectins is about 3.3:1.

14. The method of claim 7, wherein the one or more mectins is ivermectin and the one or more pyrethroids is fenpropathrin and wherein the weight ratio of the one or more pyrethroids to the one or more mectins is about 1.3:1.

15. A method of controlling a mosquito comprising applying sequentially or concurrently, an effective amount of a mixture of one or more mectins selected from abamectin and ivermectin, one or more pyrethroids selected from fenpropathrin and permethrin, and C8-10 fatty acids to the mosquito or an area in need of mosquito control, wherein the one or more mectins, the one or more pyrethroids and the C8-10 fatty acids are the only pesticidally active ingredients and wherein the weight ratio of the one or more pyrethroids to the one or more mectins is from about 3.3:1 to about 1.3:1.

16. The method of claim 15, wherein the mosquito is of a genera selected from the group consisting of *Culex, Aedes, Anopheles* and a combination thereof.

17. The method of claim 15, wherein the one or more mectins is abamectin and the one or more pyrethroids is permethrin and wherein the weight ratio of the one or more pyrethroids to the one or more mectins is about 3.3:1.

18. The method of claim 15, wherein the one or more mectins is ivermectin and the one or more pyrethroids is fenpropathrin and wherein the weight ratio of the one or more pyrethroids to the one or more mectins is about 1.3:1.

* * * * *